(12) United States Patent
Berezin et al.

(10) Patent No.: US 6,283,739 B1
(45) Date of Patent: Sep. 4, 2001

(54) STEAM-DRIVEN PROPELLER ENGINE

(75) Inventors: Sergei Romanovich Berezin, Moscow; Viktor Iosifovich Vedaiko; Anatoly Nikolaevich Noskov, both of St. Petersburg; Alexandr Georgievich Scheglov, Moscow, all of (RU)

(73) Assignee: IEC L.L.C., New York, NY (US)

( * ) Notice: Subject to any disclaimer, the term of this patent is extended or adjusted under 35 U.S.C. 154(b) by 0 days.

(21) Appl. No.: 09/402,044

(22) PCT Filed: Mar. 26, 1997

(86) PCT No.: PCT/RU97/00087
§ 371 Date: Mar. 9, 2000
§ 102(e) Date: Mar. 9, 2000

(87) PCT Pub. No.: WO98/42951
PCT Pub. Date: Oct. 1, 1998

(51) Int. Cl.[7] ............................................. F01C 19/00
(52) U.S. Cl. ................................. 418/104; 418/201.1
(58) Field of Search ............................. 418/201.1, 104

(56) References Cited

U.S. PATENT DOCUMENTS

| 598,906 | * | 2/1898 | Carnahan et al. | 418/104 |
|---|---|---|---|---|
| 4,153,395 | * | 5/1979 | O'Neil | 418/104 |
| 4,329,126 | * | 5/1982 | Nishimura | 418/104 |
| 4,487,563 | * | 12/1984 | Mori et al. | 418/104 |
| 4,709,682 | * | 12/1987 | Kato | 418/104 |
| 4,781,553 | | 11/1988 | Nomura et al. | 418/104 |
| 4,984,974 | * | 1/1991 | Naya et al. | 418/104 |
| 4,993,930 | * | 2/1991 | Uchida et al. | 418/104 |
| 5,228,298 | * | 7/1993 | Kun et al. | 418/104 |
| 5,348,456 | | 9/1994 | Kun et al. | 418/95 |

FOREIGN PATENT DOCUMENTS

| 3326910 | 3/1984 | (DE) . |
|---|---|---|
| 1026165 | 4/1966 | (GB) . |
| 94005799 | 10/1995 | (RU) . |
| 94002921 | 1/1996 | (RU) . |
| 1838632 | 8/1993 | (SU) . |
| 94027050 | * 11/1994 | (WO) ................. 418/104 |

* cited by examiner

Primary Examiner—Thomas Denion
Assistant Examiner—Theresa Trien
(74) Attorney, Agent, or Firm—Ladas and Parry

(57) ABSTRACT

A steam driven engine having a device for equilibration of propulsion forces in the bearing assemblies produced by the steam drive and equipped with steam and oil separators. The device for equilibrating the propulsion force includes a space disposed between the drive shaft and the surrounding casing, the device being connected on one side to the pressurized steam source and on the other side to a discharge pipe via a throttle channel. The clearance is situated in the casing on both sides of the drive screws and runs along the lateral surface of the drive shaft on the portion thereof opposing the direction of the propulsion force. The steam and oil separators are provided with elements for discharge of the steam and oil.

6 Claims, 3 Drawing Sheets

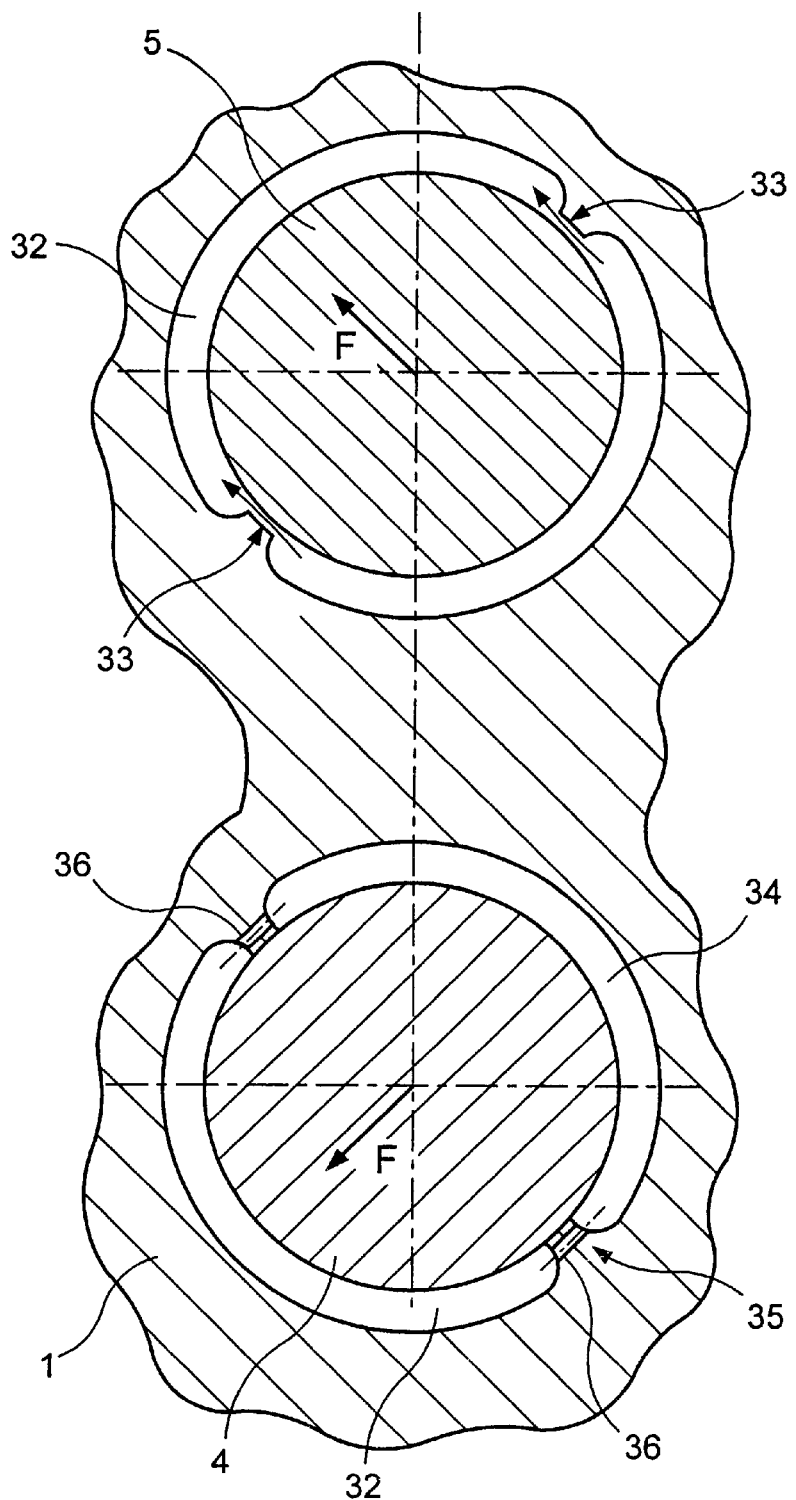
F I G. 2

STEAM-DRIVEN PROPELLER ENGINE

FIELD OF THE INVENTION

The invention relates to the field of mechanical engineering, in particular to steam engines of unvolumetric displacement, namely to steam screw engines intended for transformation of steam energy into mechanical energy.

DESCRIPTION OF THE PRIOR ART

A known steam screw engine (SU, A, 1838632), comprises a casing, inside which there is a high pressure chamber with drive and driven screws in a linkage placed therein, an output reducer and a synchronizing transmission, the output reducer being connected to the output shaft of the engine, and and to the drive screw, the transmission—providing synchronization of rotation of the screws, which are placed in bearing supports.

Also known is a steam screw engine (SU, AC, 1146482), comprising a casing, with drive and driven screws in a linkage placed therein, the shafts of which are placed in bearings, output and synchronizing transmissions, by means of the first of which the drive screw is connected to the output shaft, and by means of the second, the drive and driven screws are connected together inlet and outlet branch pipes for feed and discharge of a working medium, in particular steam, a cylinder for compensation of axial propulsion forces comprising a piston connected to the shaft of the drive screw, and a greasing system of the bearings and the transmissions, the output and synchronizing transmissions being located on different sides of the screws, the branch pipe and cylinder being connected to a source a steam.

A disadvantage the known devices is the rather low efficiency due to losses in the bearing because of a penetration therein of stream from area of high pressure and the presence of axial and radial overtension from operation of the screws. Besides, the known engines have short service life in view of the increased wear of the bearing and transmissions.

SUMMARY OF THE INVENTION

An object of the present invention is to create a steam screw engine possessing increased efficiency while increasing its motor-resource by improving the seals during operation and technological clearances between the screws and of more effective utilization of the steam, and equilibration of forces acting on the bearings developed by the drive.

This object is achieved by a steam screw engine comprising a casing drive and driven screws in a linkage in said casing shafts of said screws placed in bearing nodes, output and synchronizing transmissions, by means of the first of which the drive screw is connected to the output shaft, and by means of the second, the drive and driven screws are connected together inlet and outlet branch pipes for feed and discharge of a working medium, in particular steam, a cylinder for compensation of axial forces from the screws including a piston connected to the shaft of the drive screw, and a greasing system of the bearings and transmissions, the output and synchronizing transmissions being located on different sides of the screws, and the inlet branch pipe and cylinder being connected with a source of steam, additionally provided are device for an equilibration of forces in bearing nodes originating on the part of screws, both separators a steam and oil placed from shafts between screws and the bearings the device for equilibration of forces in the bearing compressor space formed between the shaft and the casing and connected on one side with the source a steam, and on the other side, —via throttling channels-with the outlet branch pipe, and the space is made in the casing on both sides of the screws and is placed along a lateral area of the shaft at a site located opposite a direction of forces from the screws, the separators of steam and oil included means for pressure discharge and of steam oil.

It is expedient, that each separator of steam and oil is made in the form of seal rings, between which the units of a vending of steam and/or oil are located.

It is preferable, that each means for discharge of steam oil is made in the form of, at least, two spaces, each of which is located between adjacent seal rings, and the first space—a discharge one, is located on the side of a bearing, is connected by the channel connected to the atmosphere, and the second space is located on the side of the screw, is connected by means of the channel connected to the outlet branch pipe.

It is expedient, that the means for discharge of the steam and oil is supplied with a mechanism for forced discharge of steam and oil.

It is expedient, that the mechanism for forced discharge of steam and oil is made in the form of a diaphragm, located between adjacent seal rings with chambers one of which at the side of a the bearings is, connected with the channel connected to the hydraulic reservoir of the greasing system, and the second clearance of which located on the side of the screw, is connected with the channel connected to the atmosphere, on a surface of the shaft or the diaphragm at the site of their interaction with the opposing screw, which inputs are connected with the atmosphere, and outputs with an appropriate clearance, a helical groove connected with a chamber which is connected with the hydraulic reservoir, is executed with a direction appropriate to a direction of the drive screw, with the possibility of a support of a forced discharge of penetrated oil to the hydraulic reservoir.

BRIEF DESCRIPTION OF THE DRAWINGS

FIG. 2 is a sectional view taken on line 2—2 in FIG. 1.

THE BEST VARIANT TO CARRY OUT THE INVENTION

Figure 1:
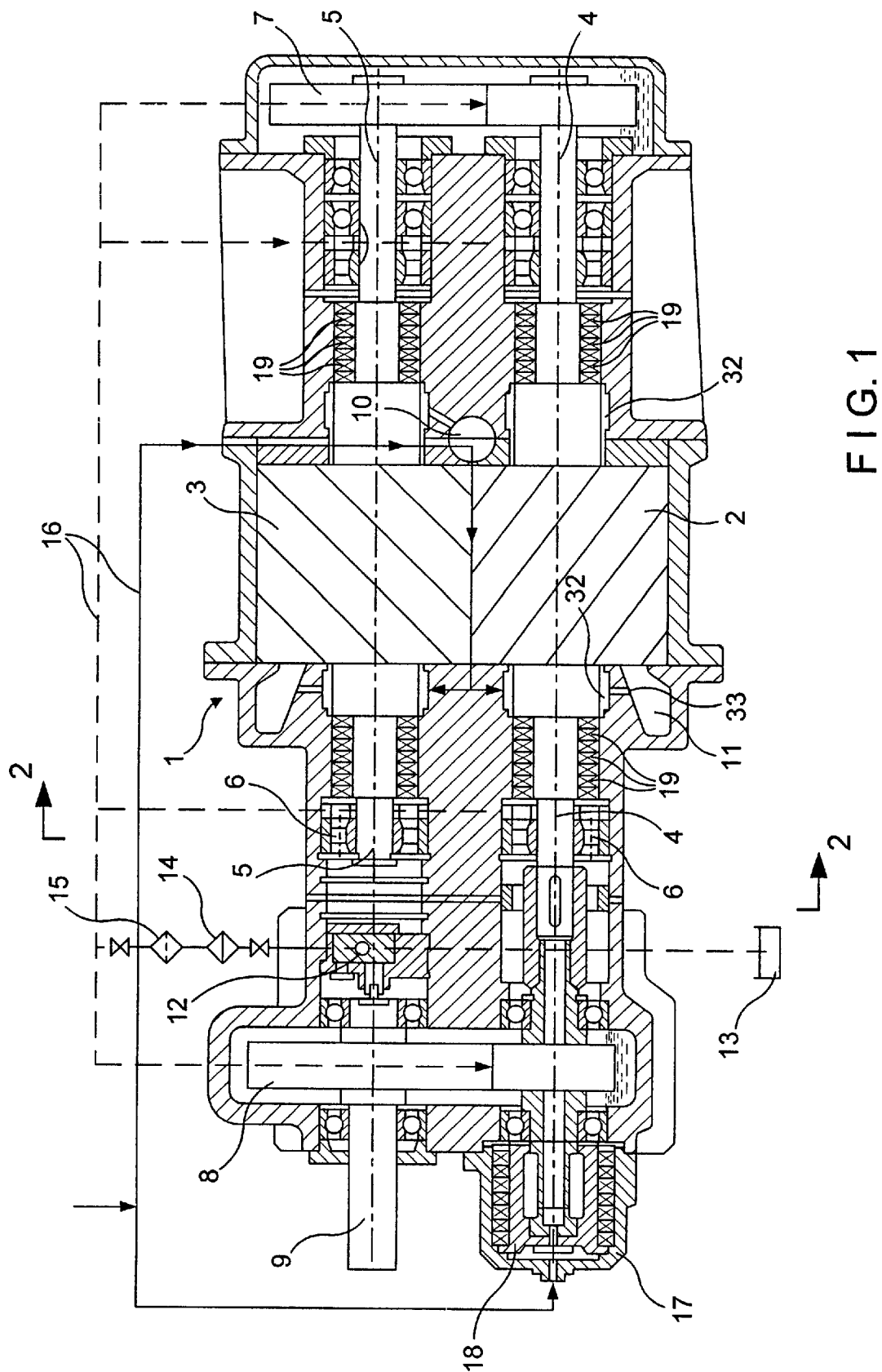
FIG. 1 is a longitudinal sectional view of the steam screw engine of the invention.

The steam screw machine or engine according to the invention comprises a casing or tank 1 (FIG. 1), in the high pressure chamber of which drive screw 2 and driven screw 3 are in driving engagement, the shafts 4 and 5 of the screws being in the supported bearings 6. The screws are connected by synchronizing transmission 7, gears the of which are placed on shafts 4 and 5 on one screws. On the other side of screws 2 and 3 is an output transmission 8, intended for delivery of output power and connected on one side with the drive screw 2, and on the other side with the output shaft 9 of the machine.

Inlet and outlet branch pipes 10 and 11 (FIG. 1) are provided for feed and discharge of the steam, pipe 10 is connected with the high pressure chamber and with the source of the steam ensuring feed of the steam under high pressure to the said chamber (represented by an arrow and solid line).

A system of greasing the bearing 6 and transmissions 7 and 8 includes a pump 12 (FIG. 1) driven by the output shaft 9. The input of the pump 12 is hydraulically connected to a hydraulic reservoir 13, and the output of the pump 12 passes through an oil cooler 14 and a filter 15 and oil lines 16, ensuring feed of oil in a zone of transmissions 7 and 8, and also to the bearings 6 (represented as an arrow and dashed line).

For equilibration of axial forces produced by on screws 2 and 3 and, as a consequence, in travel of the shafts bearings 6, the steam screw machine (FIG. 1) is provided with a cylinder 17 for compensation of the axial forces, the piston 18 of which is connected to the shaft 4 of the drive screw 2, the space of the cylinder 17 is connected with the source of the steam.

On shafts 4 and 5 of the screws 2 and 3 between bearings 6 and said screws, i.e. in zones of the most probable contact of steam and oil, separators of steam and oil are located. Each separator of steam and oil includes a plurity of seal rings 19, adjacent to one another for preventing penetration of steam or oil from the opposite directions. Between the adjacent seal rings 19, the means for discharging the steam and/or oil are located.

The means of discharging the steam and/or oil is made in the form of, at least, two spaces 20 and 21 (FIGS. 3,4), each of which is located between the seal rings 19, and the first space 20, located on the side of a bearing, is connected by a channel 22 with the atmosphere—to serve as a drainage space, and the second space 21, located on the side of the associated screw, is connected by means of a channel 23 with the outlet branch pipe. To increase the efficiency of isolation of the high pressure chamber from oil a means of forced discharge of steam and oil may be provided.

The means for a forced discharge of steam and/or oil is made in the form of a diaphragm 24 (FIG. 4), located between adjacent seal rings 19 with clearances 25, one of which from the side of the bearing 6 is connected with the channel 26 of hydraulic reservoir 13 of the greasing system, and the second clearance located on the side of the screw, is connected with the channel 23, connected with the outlet branch pipe 11.

On a surface of the shafts 4 and 5 (FIG. 4) at a site of their interaction with diaphragm 24 opposite directed helical grooves 27 and 28 are made, inputs of which are connected by means of ring recess 29 and channel 30 made in diaphragm 24 with the atmosphere, and outputs—with an appropriate clearance 25, thus the groove 27, connected with clearance 25, connected with a hydraulic reservoir 13, is made with a direction appropriate to a direction of the drive screw 2 for support of a forced discharge of oil to a hydraulic reservoir 13 through clearance 25 by pressure of the air, providing, thus, the reliable isolation of the oil and steam environments promoting the increase of the efficiency and life expectancy of the machine as a whole. It is feasible to form the helical grooves 27 and 28 in diaphragm 24 at the site of its interaction with the shaft of the screw. The channel 30 is connected with the atmosphere by means of the channel 31.

The device for an equilibration of axial forces in the bearings also is intended for achieving this effect. The device (FIG. 2) is located on shafts 4 and 5 between screws 2 and 3 and the bearings 6. Each device is made in the form of a space 32, formed between the shaft 4 or 5 and casing 1 and connected on one side with a source of steam, and on the other side—by means of, at least, one throttling channel 33 with the outlet branch pipe 11, in particular through the intermediate chamber 34. In FIG. 2 a variant of execution of the throttling channel 33 is in the form of a slot formed between the shaft of the screw and a projecting indent 35 of casing 1 is represented. In another variant (FIG. 2) throttling channels 33 are made in the form of holes 36, placed projecting indents 35. The projecting indents 35 are made on a casing 1 along the shafts 4 and 5 of the corresponding screws 2 and 3 and form the space 32 and an intermediate chamber camera 34.

The space 32 is made in casing 1 and is placed along a lateral area of the shaft 4 or 5 at a site located opposite the direction of the axial force.

For the purpose of additional increase of the efficiency of separating steam from oil, there are means for sealing and separating of steam from oil between the piston 18 (FIG. 1) and cylinder 17 for compensation of axial travel sequentially located in a direction from its space.

In one variant the seal ring 19 (FIGS. 3, 4) is made in the form of a barrel 37 and spring-loaded in casing 38. The seal rings 19, located on shafts 4 and 5, are placed in the intermediate tank 39.

The operation of the steam screw engine is carried out as follows.

Figure 3:
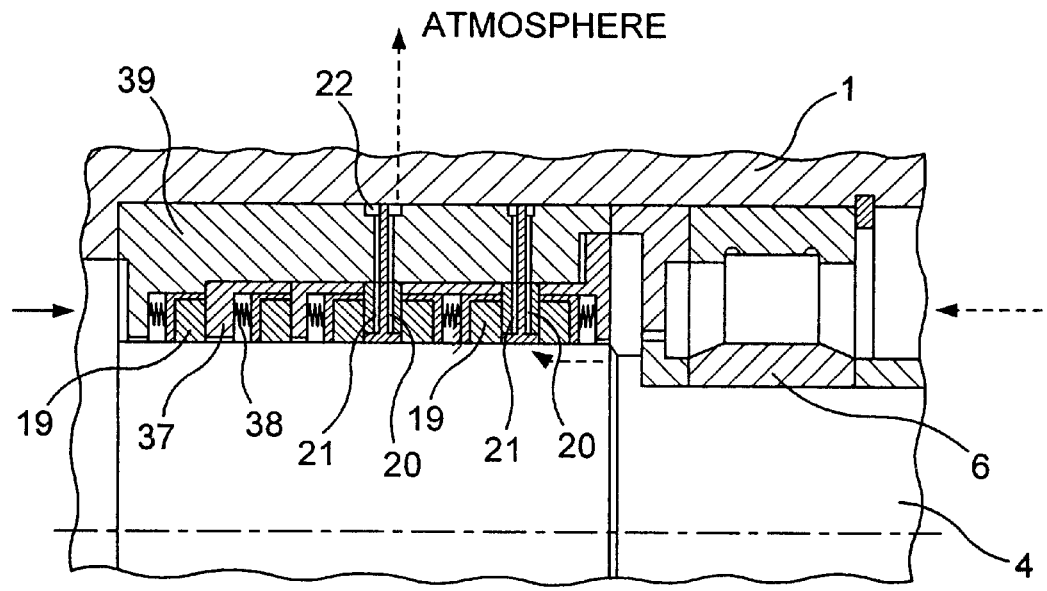
FIG. 3 is an enlarged view of the separator of steam and oil of the steam screw engine.
Figure 4:
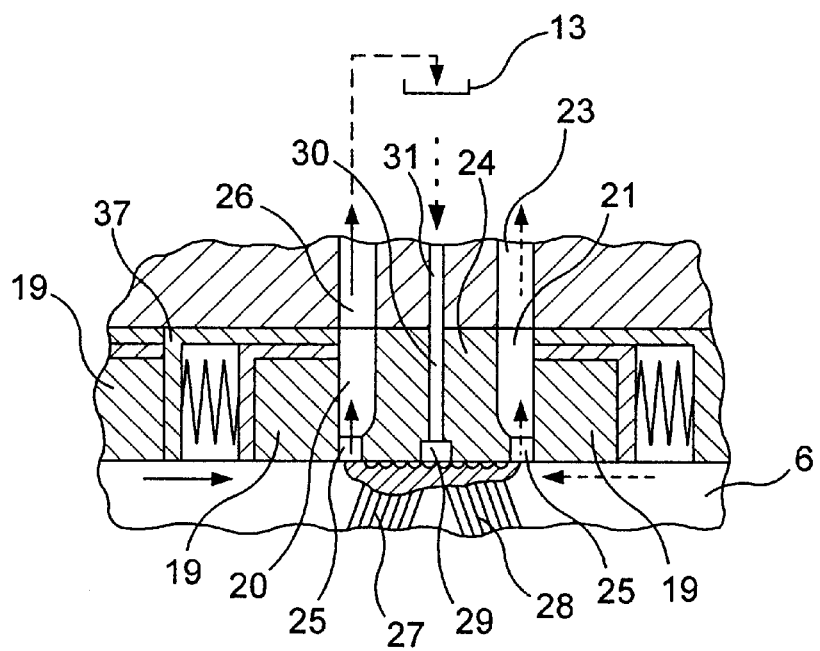
FIG. 4 shows the separator of steam and oil with a mechanism for forced discharge.

The steam under high pressure comes in inlet branch pipe 10 and produces in rotation of screws 2 and 3 (FIG. 1,3 and 4). Depleted steam comes out through the outlet branch pipe 11 under pressure exceeding atmospheric. At the same time the steam from its source under high pressure comes into the cylinder 17, where acting on the piston 18, connected with the shaft 4, develops the force opposing axial forces produced by interaction of screws 2 and 3. During the transformation of energy of the steam into mechanical energy the steam under high pressure constantly moves in a space 32 (FIG. 2) of the device for an equilibration of forces in the bearing 6. In spaces 32, placed along a lateral area of the shafts 4 and 5 opposite the direction of the forces on the side of screws, by the pressure the steam on the shaft a radial forces "F", compensating the forces and thus unloading, the bearings 6 in these sites. Besides, steam coming through the throttling channels 33 from the space 32 into the intermediate chamber 34 and further into the outlet branch pipe 11 causes condensation. The liquid, formed during the steam condensation, fills any clearances, reducing the probability of its penetration in a zone of the bearings while unloading the bearings.

The pump 12 supplies oil under pressure through filter 15 and cooler 14 to transmissions 7 and 8, and also to the bearing 6.

Penetration of oil into the of high pressure chamber, and the steam into the bearings and transmissions essentially reduces the efficiency of the engine and life expectancy of bearing elements. For exception it the following is stipulated.

In the case of an output of the steam under high pressure for the high pressure chamber and first ones of the seal rings 19, the steam (in FIGS. 3 and 4 represented by an arrow and solid line) arrives in space 21 and travels further by means of the channel 23—to the outlet branch pipe 11. Taking into account, that pressure of the steam in inlet branch pipe 10 exceeds atmospheric, a significant part of it, penetrated through the spaces and the seal rings 19 will be prevented from contacting the transmissions and the seals. The rest of the steam in a small amount passes through the subsequent seal rings 19 in to space 20, connected with the atmosphere. From the other side, i.e. from the side of the bearings 6, the oil which has penetrated through the seal rings 19 arrives in the same space 20.

The diaphragm 24, which ensures the removal of the penetrated oil to hydrotank 13, and the steam—to the atmosphere prevent contact of the oil and the steam in the space 20.

The mechanism of a forced discharge of the steam and/or oils achieves stable discharge of the oil and steam. According to the variant represented in FIG. 4, while rotation of the shaft with the screws 2 or 3 opposite directed helical gooves executed on the shaft, operating as inclined Archimedian screw pumps, draw in the air (represented by the arrow with points) from an atmosphere through the channel, direct a stream of air in one groove on penetrated oil and in other groove—to steam and condensate, and transport the oil to hydraulic reservoir 13 via clearances 25 and channels 26, and steam and condensate via channels 23—into the atmosphere. Thus the reliable isolation of oil and steam is created.

THE INDUSTRIAL USABILITY

The present invention can be used in power installations, ground and water vehicles.

What is claimed is:

1. A steam screw machine comprising a casing drive and driven screws in a linkage in said casing, shafts of said screws placed in bearings, output and synchronizing transmissions, by which the drive screw is connected to an output shaft, and said drive and driven screws are connected together, inlet and outlet branch pipes for feed and discharge of steam, a cylinder for compensation in the bearings of axial forces developed by screws including a piston connected to shaft of the drive screw, a greasing system of the bearings and the transmissions, the output and synchronizing transmission being located on opposite sides of the screws, the inlet branch pipe and cylinder being connected to a source of steam, a device for equilibration of jet gains forces developed in the bearings from the screws, separators for the steam and oil placed on the shafts between the screws and the bearings, said device for equilibration of jet forces in the bearings comprising a space formed between the drive shaft and the casing and connected at one side to a the source a steam, and at the other side to throttling channels connected to the outlet branch pipe, the space being provided in the casing along a lateral area of the shaft at a site located opposite a direction of steam flow said separators of steam and oil including means for discharging steam and oil.

2. The steam screw machine of claim 1, wherein each separator of steam and oil is includes plurality of adjacent seal rings, between which the means for discharge of steam and oil are located.

3. The steam screw machine of claim 2, wherein the means for discharging steam and oil is made in the form of, at least, two spaces, each of which is located between adjacent seal rings, one space being for discharge, is located on the side of a bearing and is connected by the channel with the atmosphere, and the other space is located on the side of the screw and is connected by the throttling channel with the outlet branch pipe.

4. The steam screw machine of claim 3, wherein the means for discharging the steam and oil includes means for forced discharge of the steam and oil.

5. The steam screw machine of claim 4 wherein the means for forced discharge of the steam and oil comprises a diaphragm having chambers, one of which on the side of the bearings is connected to the channel connected to a hydraulic reservoir of the greasing system, and the other of which on the side of the screws, is connected to the channel connected to the atmosphere, the diagram and shafts having facing surfaces provided with helical grooves one which connected to the atmosphere, and the other of which is connected to a hydraulic reservoir.

6. The steam screw machine of claim 1, wherein said separators are located in said casing for compensation of axial travel.

* * * * *